H. HAISS.
MEANS FOR HEATING THE STEERING WHEELS OF AUTOMOBILES, AEROPLANES, MOTOR BOATS, AND THE LIKE.
APPLICATION FILED DEC. 20, 1917.
1,317,491.
Patented Sept. 30, 1919.
3 SHEETS—SHEET 2.
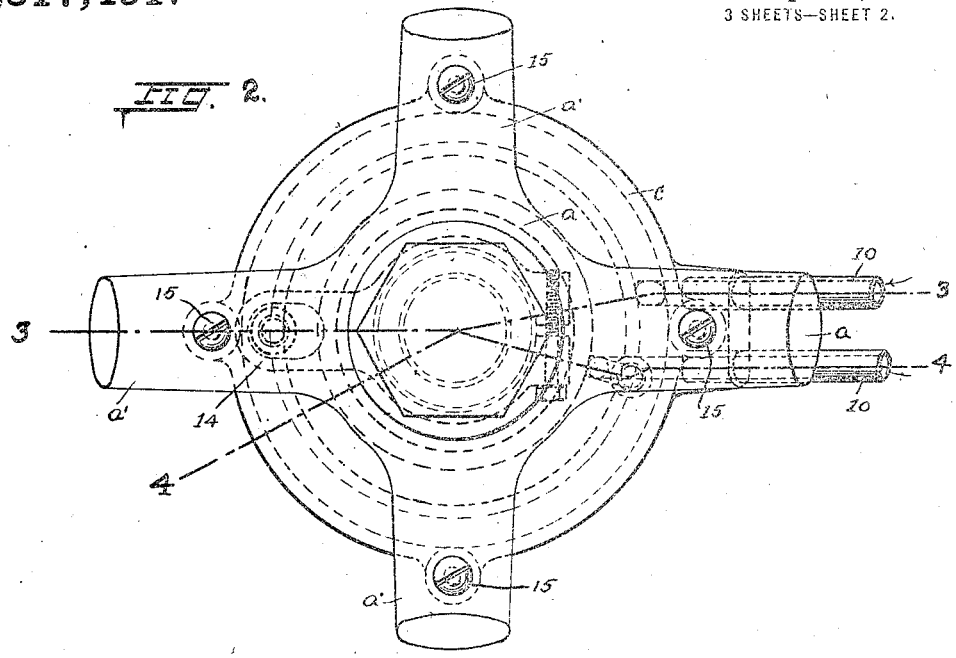
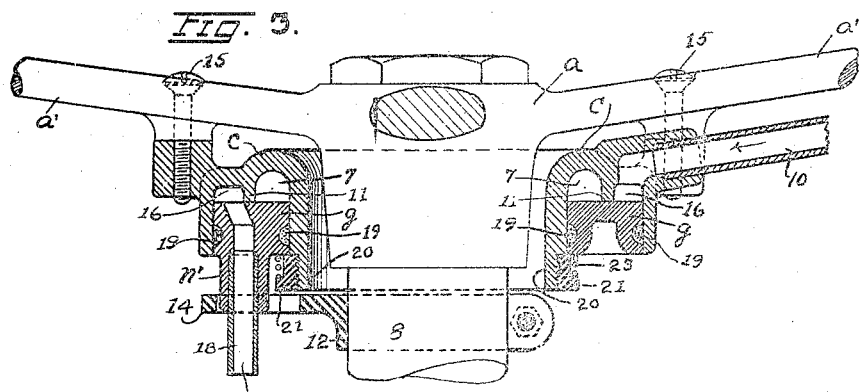
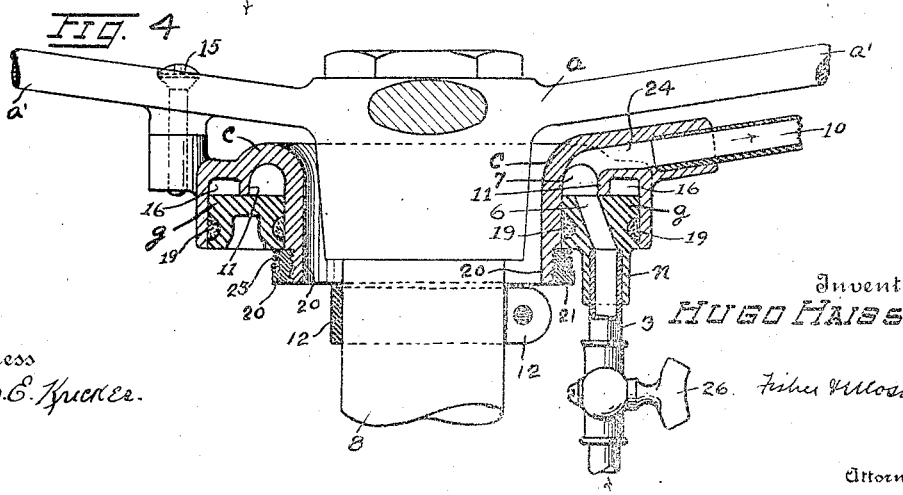
Witness
Geo. E. Kricker.
Inventor
Hugo Haiss
Attorneys H. HAISS.
MEANS FOR HEATING THE STEERING WHEELS OF AUTOMOBILES, AEROPLANES, MOTOR BOATS, AND THE LIKE.
APPLICATION FILED DEC. 20, 1917.
1,317,491.
Patented Sept. 30, 1919.
3 SHEETS—SHEET 3.
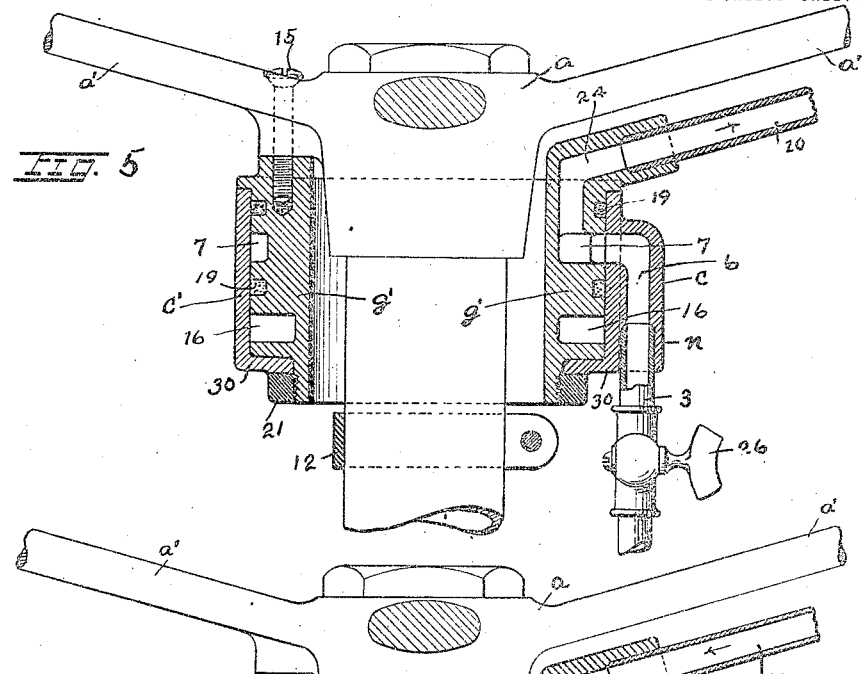
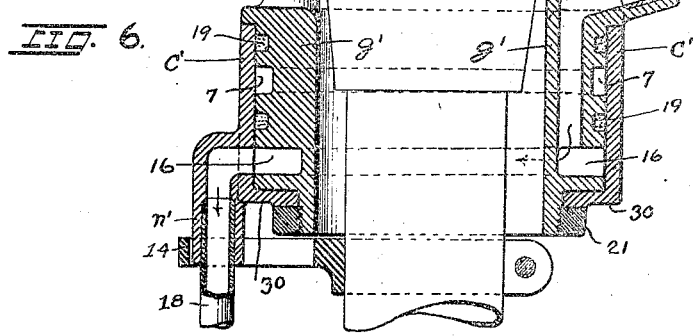
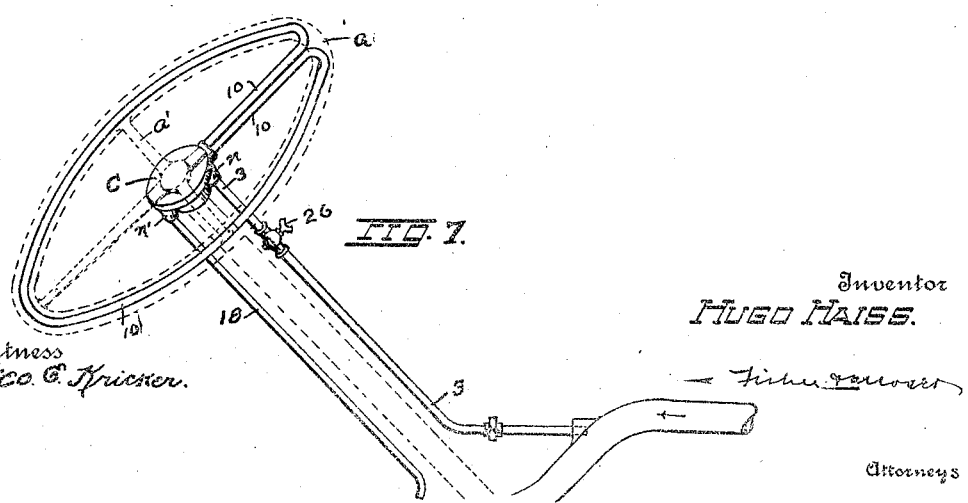
Inventor
HUGO HAISS.

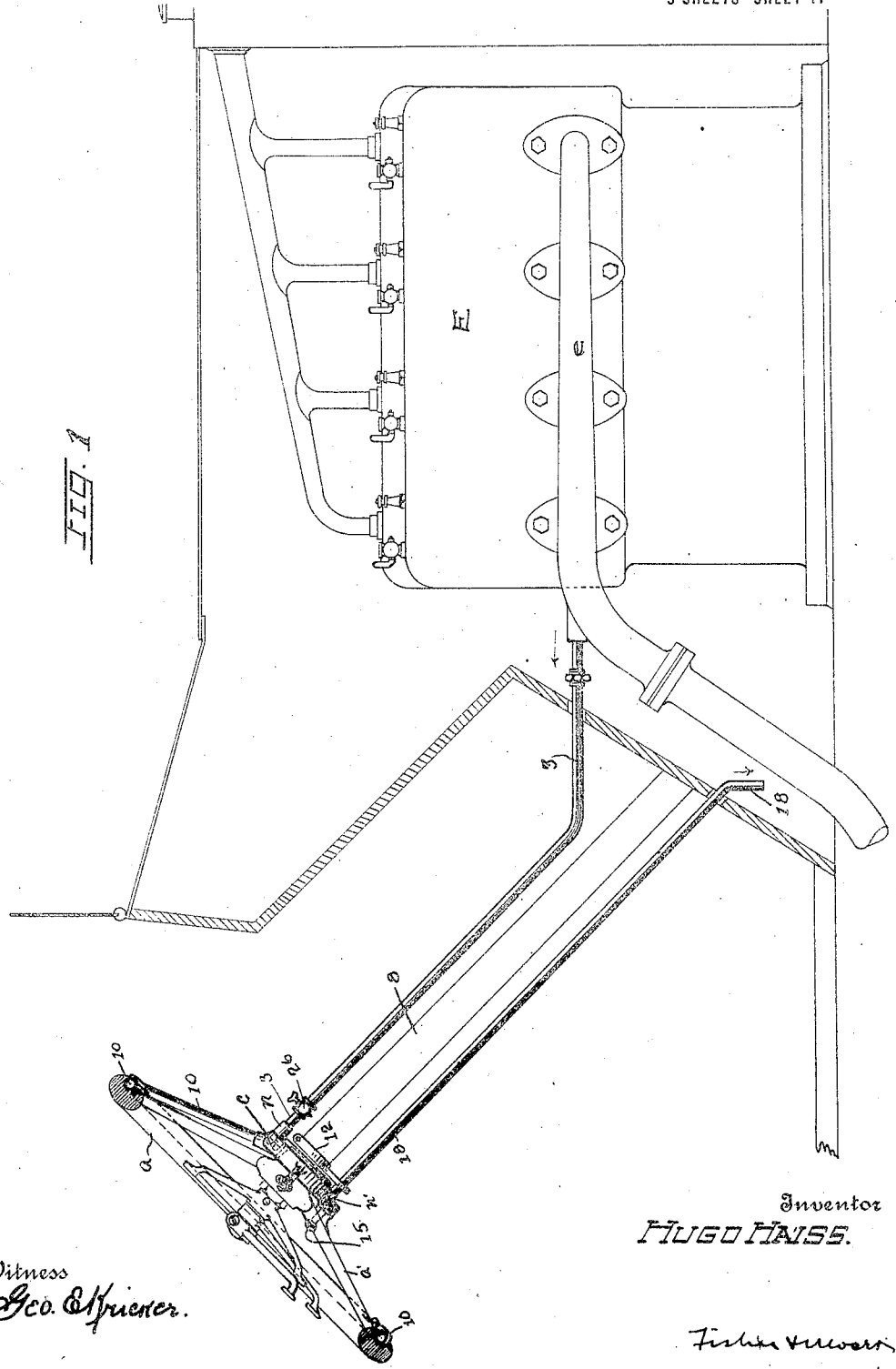

UNITED STATES PATENT OFFICE.

HUGO HAISS, OF ALLIANCE, OHIO, ASSIGNOR OF ONE-HALF TO EUGENE W. HAINE, OF CLEVELAND, OHIO.

MEANS FOR HEATING THE STEERING-WHEELS OF AUTOMOBILES, AEROPLANES, MOTOR-BOATS, AND THE LIKE.

1,317,491.

Specification of Letters Patent. Patented Sept. 30, 1919.

Application filed December 20, 1917. Serial No. 208,072.

*To all whom it may concern:*

Be it known that I, HUGO HAISS, a subject of the Empire of Germany, residing at Alliance, in the county of Stark and State of Ohio, have invented certain new and useful Improvements in Means for Heating the Steering-Wheels of Automobiles, Aeroplanes, Motor-Boats, and the like, of which the following is a specification.

This invention pertains to means for heating the steering wheel of an automobile, aeroplane, motor boat and the like, by use of the exhaust gases from the engines or by some other heating medium, like steam or hot water, and all substantially as shown and described and particularly pointed out in the claim.

In the accompanying drawings, Figure 1 is a side elevation of an installation of the invention in an automobile or like vehicle having explosive engines, and showing the steering wheel and some other parts in cross section.

Fig. 2 is a somewhat enlarged plan view of the middle portion of the steering or hand wheel and parts in that connection seen in sectional elevation, Fig. 1. Fig. 3 is a vertical sectional elevation of Fig. 2 on a line corresponding to 3—3, Fig. 2, and Fig. 4 is a sectional elevation on a line corresponding to 4—4, Fig. 2, and as hereinafter described.

Figs. 5 and 6 represent a modification of the device; Fig. 5 being a sectional elevation, and Fig. 6 a sectional elevation with the stationary parts in opposite position as compared with Fig. 5. Fig. 7 is a perspective view of the circulatory pipe for the heating medium as adapted to the steering wheel and its connections in Fig. 1.

Having reference first to the construction shown in Figs. 1 to 4, the invention discloses what may at present be regarded as my preferred means for imparting a measure of heat or warmth to the steering wheel. It need not really be said that as an every-day expedient in handling automobiles, motor trucks and other vehicles in cold weather, to say nothing of aeroplanes in high altitudes, it is above all else desirable that the man at the wheel should have some means beyond the use of gloves for protecting his hands and assuring his control of the machine. In all such work, the hands are both the most important as well as the most exposed portions of the body, and no man with cold stiffened fingers can do his best service at the wheel or about other parts of the machine. Indeed, it is not an unusual experience that men are wholly incapacitated for doing their work because their hands become stiff and unserviceable by excessive cold. On the contrary, if the hands are kept warm they cannot only do their allotted work with comfort and certainty, but there is a direct contribution therewith of heat to the entire body, and thus the efficiency of the man as well as his comfort are proportionally enhanced.

The present invention is, therefore, directed to these advantages in the operation of automobiles, motor trucks, aeroplanes and other machines in which steering wheels or other hand controlled appliances are employed, and especially for men in the service of the Government both at home and abroad and whose exposure is liable to be under great stress of operating conditions and without possible relief under extremely low temperatures for indefinite periods, day and night.

To these ends I have provided the steering or hand wheel $a$ with means for heating the same to any desired warmth during the entire time it is in use, and in the present arrangement such heating is obtained from at least a portion of the exhaust gases from a multiple cylinder engine E through a special service pipe 3, which connects directly with the main exhaust pipe or manifold $e$ of the motor or engine and extends through connections to the hand wheel by intermediate parts as shown. These parts necessarily provide for a continuous flow of the gases to the hand or steering wheel $a$ under any and all rotations and positions of the wheel in use, and to this end the special pipe 3 is engaged at its upper end in a nipple $n$ on the bottom of the stationary gland $g$ and which has a passage 6 through the same for the inflowing gas or heating agent to the channel 7 in the bottom of the annular casing c rotatably mounted over and upon the said gland.

The said parts c and g are essentially the new elements or members introduced into the otherwise old organization of the steering wheel a with the steering post 8, and serve to establish communication for the heating agent through the said pipe 3 with the inlaid pipe 10 in the bottom of the steering wheel. The gland g is secured by a clamp 12 to the steering post 8 in such manner as to make the same rigid with said post, while the casing c is fixed to the radial arms a' of the steering wheel by screws or bolts 15 and which arms connect the rim thereof with its hub as usual, the connections being such as to make said casing rigid with the wheel and rotatable therewith.

Several minor details are involved in the foregoing connections which need not be emphasized as they may be varied, but the clamp 12 is shown as having an arm 14 which engages over a nipple n' on the gland g, Fig. 3, and by which the gland is fixed rigidly with the steering post through said clamp, and the screws 15 through the radial arms of the hand wheel engaged in the casing c serve to make rigid the connection between the wheel and the casing as above described. The casing c also has an outer annular channel 16 in its bottom separated by a wall 11 from the inner channel 7, and serving as the outlet passage for the gases which have their exit through nipple n' and the pipe 18 connected therewith. Suitable packing is interposed at 19 about the gland within the inclosing flanges or sides of the casing c to make a close working engagement, and the inner flange or portion 20 extends down past the body of the gland about its inside and has a ring nut 21 threaded thereon to confine the casing in suitably close working relations with the gland, the channel separating wall 11 serving as a bearing for the casing on the gland. If the said nut 21 is not screwed up closely the wire spring 23 about the same will maintain a good working connection.

Now, having the foregoing construction substantially as shown in Figs. 1 to 4, and above described, the heating medium is free to flow into and fill the inner channel 7 of the casing in all positions of the steering wheel, and the heating medium passes to the rim of the wheel by way of port 24, Fig. 4, over the channel 16 to the heat circulating pipe 10 in the rim of wheel a. The said pipe is a unit, and has its ends connected with the respective channels 7 and 16 by the parallel radial terminals or ends thereof as seen in Fig. 2, and from which ends the pipe is curved in circular form in both directions to conform to the channel or groove in the bottom of the rim of the hand wheel a. As herein shown the pipe 10 is laid its full depth in the rim and it may be overlaid at the exposed bottom with any suitable covering, if preferred. It will also be noticed that by these means the heating medium traverses the entire circuit of the rim through said pipe, warming all portions alike, enters through one end or terminal of the pipe and the communicating channel 7, and exhausts through the other end or terminal and its channel 16.

The inlet pipe 3 has a suitable cock 26 for regulating the temperature at the wheel by shutting off the heating agent more or less as may be desired, and when heat is not wanted it is only necessary to close this cock entirely. The inlet pipe 3 and the coupling beneath the wheel are also preferably inclosed or covered with asbestos or equivalent material to prevent loss of heat by radiation. The outlet nipple n' is also preferably located at the bottom side of the coupling member and in a lower plane than the intake to promote drainage of the condensation of the gases.

In the modification, Figs. 5 and 6, the parts marked c and g in the foregoing construction have practically exchanged positions. That is, the part marked g' and which is rigidly affixed to the steering wheel by screws 15, as before, is the gland proper and the part c' which is stationary with the steering post is the casing proper. The said gland in this instance has the further modification of the heat circulating channels 7 and 16 formed therein one above the other in its outer bearing portion, while the casing c' encircles the gland g' and closes its channels and the packing therein and practically seats the gland on its shoulder 30 at the bottom. In other respects the two forms of the device are substantially alike and bear the same designating characters, and the differences between the two forms are suggestive of the changes of which the invention is susceptible without departing from the intent and spirit of the invention.

In both the foregoing constructions the casing and the gland constitute what is practically a rotatable coupling interposed between the steering wheel and the steering post, and which coupling has the function of conveying the flow of the heating agent to and from the steering wheel regardless of the degree of rotation given to the wheel. The respective parts of the coupling might be made integral with the wheel hub and the post, respectively, and the wheel rim and spokes might be made hollow or provided with passages for circulating the heating agent, but the preferred construction is a wooden rim with the small circulating pipe at its bottom substantially as shown, so that the most effective use may be made of the hot gases, and I find that a relatively small copper pipe protected by the wood handle or rim is very effective.

The heating agent or medium contemplated herein necessarily is of fluid nature, being either hot gases, steam or water derived from the engine, and where this heating agent or medium is obtained from the engine of an automobile or other vehicle having a steering wheel, the heating of the wheel is attained without additional cost or expense for the heating agent, thus working economy along with a new and important use for the engine in combination with the steering wheel and apparatus herein described.

Although the channels 7 and 16 are formed in the upper and rotary coupling member and are so described, it remains, however, in both forms of the device shown that the wall upon one side of said channels is formed by the other or stationary coupling member and hence in this sense the said channels may be said to be constituted in part by both said members.

What I claim is:

In a motor driven vehicle, a solid steering wheel having an annular channel in the bottom thereof and heating means therefor consisting of a pipe laid in the said channel and having its terminals bent into parallel relations and extended inward adjacent to the hub of said wheel, in combination with the steering post, a coupling member rigid with the top of said post and a coupling member coacting therewith rigid with said wheel, and said coupling members having channels open respectively to the terminals of said heating pipe and adapted to permit a heating medium to circulate through the same.

Signed at Cleveland, in the county of Cuyahoga and State of Ohio, this 12th day of December, 1917.

HUGO HAISS.